US008867110B2

(12) United States Patent
Chen (10) Patent No.: US 8,867,110 B2
(45) Date of Patent: Oct. 21, 2014

(54) IMAGE FORMING APPARATUS (71) Applicant: Jian Chen, Naka-ku (JP)

(72) Inventor: Jian Chen, Naka-ku (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/754,195

(22) Filed: Jan. 30, 2013

(65) Prior Publication Data

US 2013/0194643 A1  Aug. 1, 2013

(30) Foreign Application Priority Data

Jan. 31, 2012 (JP) ................. 2012-018610

(51) Int. Cl.
*H04N 1/04* (2006.01)
*H04N 1/00* (2006.01)
*B41J 13/10* (2006.01)
*B65H 1/04* (2006.01)

(52) U.S. Cl.
CPC ...... *H04N 1/00599* (2013.01); *B65H 2405/324* (2013.01); *B65H 2405/1122* (2013.01); *B65H 2601/523* (2013.01); *B41J 13/103* (2013.01); *B65H 1/04* (2013.01)
USPC ............ 358/498; 358/497; 358/496; 358/474

(58) Field of Classification Search
USPC .................. 358/498, 497, 496, 474
See application file for complete search history.

(56) References Cited

U.S. PATENT DOCUMENTS

2005/0052517 A1* 3/2005 Fujioka et al. ................. 347/104
2008/0084021 A1* 4/2008 Nakamura ..................... 271/145

FOREIGN PATENT DOCUMENTS

JP  2010-055126 A  3/2010

\* cited by examiner

*Primary Examiner* — Houshang Safaipour
(74) *Attorney, Agent, or Firm* — Banner & Witcoff, Ltd.

(57) ABSTRACT

An image forming apparatus includes: a housing accommodating an image forming unit and includes a side wall and an opening to feed the sheet from an outside to the image forming unit; a feeding tray moving between a holding position and an accommodation position; a guide provided at the feeding tray, the guide being configured to abut against the sheet which is held on the feeding tray from a rear end side of the sheet in a feeding direction along with the sheet is fed to the image forming unit and define a holding position of the sheet when the feeding tray is arranged at the holding position and the sheet is placed on the feeding tray; and a recess part formed on the sidewall of the housing and configured to accommodate the guide therein when the feeding tray is arranged at the accommodation position.

12 Claims, 5 Drawing Sheets

IMAGE FORMING APPARATUS

CROSS-REFERENCE TO RELATED APPLICATION

This application is based upon and claims the benefit of priority of Japanese Patent Application No. 2012-018610 filed on Jan. 31, 2012, the contents of which are incorporated herein by reference in its entirety.

BACKGROUND

The present disclosure relates to an image forming apparatus having an image forming unit that forms an image on a recording medium, and more particularly, to an image forming apparatus that swingably supports a feeding tray, which holds therein a recording medium on which an image is formed by the image forming unit, on one side surface of a housing of the image forming apparatus.

In the related art, an image forming apparatus forming an image on a recording medium has been suggested which swingably supports a feeding tray, which holds therein a recording medium such as recording sheet on which an image is formed, via a hinge and the like so as to reduce a setup space when the age forming apparatus is not used. In this case, when the feeding tray is not used, it is possible to accommodate the feeding tray along a side surface of a housing (for example, refer to JP-A-2010-55126).

SUMMARY

According to the above image forming apparatus, however, it may be necessary to provide the feeding tray with a guide that defines a holding position of the recording medium. In particular, when a guide that abuts on the recoil medium from a rear end side of the medium in a feeding direction to an image forming unit is provided, the guide should be configured to move on the feeding tray so as to define a rear end position of a recording medium having a different size. A rear end position of a recording medium tray protrude from the feeding tray, depending on a size of the recording medium. In this case, an extension mechanism that extends the guide from the feeding tray is required so as to support the rear end of the recording medium. At a state where the guide is arranged at the rear end position of the recording medium, when accommodating the feeding tray along a side surface of the housing, the side surface interferes with the guide.

Therefore, it is considered to configure the guide so that it can be moved to a position (hereinafter, referred to as 'opening neighborhood') at which the guide can be opposed to an opening, which is provided to feed the recording medium to the image forming unit in the housing, upon the accommodation. In this case, when accommodating the feeding tray along the side surface of the housing, the extension mechanism is returned above the feeding tray from the extension position, the guide is moved to the opening neighborhood and the feeding tray can be then accommodated. At this time, since the guide is inserted into the opening, the guide does not interface with the side surface of the housing.

However when the above configuration is adopted, after operating the extension mechanism, it is necessary to move the guide to the opening neighborhood and then to accommodate the feeding tray, so that the user's convenience is deteriorated. When the guide is provided to the feeding tray so that the guide can be moved to the opening neighborhood, the configuration is complicated, so that the manufacturing cost of the image forming apparatus is increased.

Therefore, an object of one aspect of the present disclosure is to improve on user's convenience of an image forming apparatus in which a feeding tray holding therein a recording medium is swingably provided on one side surface of a housing.

An image forming apparatus according to the aspect of the present disclosure includes:

an image forming unit configured to form an image on a sheet;

a housing configured to accommodate the image forming unit therein and includes a sidewall which forms at least a part of a first side surface of the housing, and an opening which is arranged at a lower part of the sidewall so as to feed the sheet from an outside to the image forming unit, the sidewall and the opening being formed on the first side surface;

a feeding tray swingably supported by the housing and configured to move between a holding position at which the sheet which is fed to the image forming unit through the opening is held and an accommodation position at which the feeding tray closes the opening;

a guide provided at the feeding tray, the guide being configured to abut against the sheet which is held on the feeding tray from a rear end side of the sheet in a feeding direction along with the sheet is fed to the image forming unit and define a holding position of the sheet when the feeding tray is arranged at the holding position and the sheet is placed on the feeding tray; and a recess part formed on the sidewall of the housing and configured to accommodate the guide therein when the feeding tray is arranged at the accommodation position.

DESCRIPTION OF EXEMPLARY EMBODIMENTS

[Overall Configuration of Laser Printer]

Figure 1:
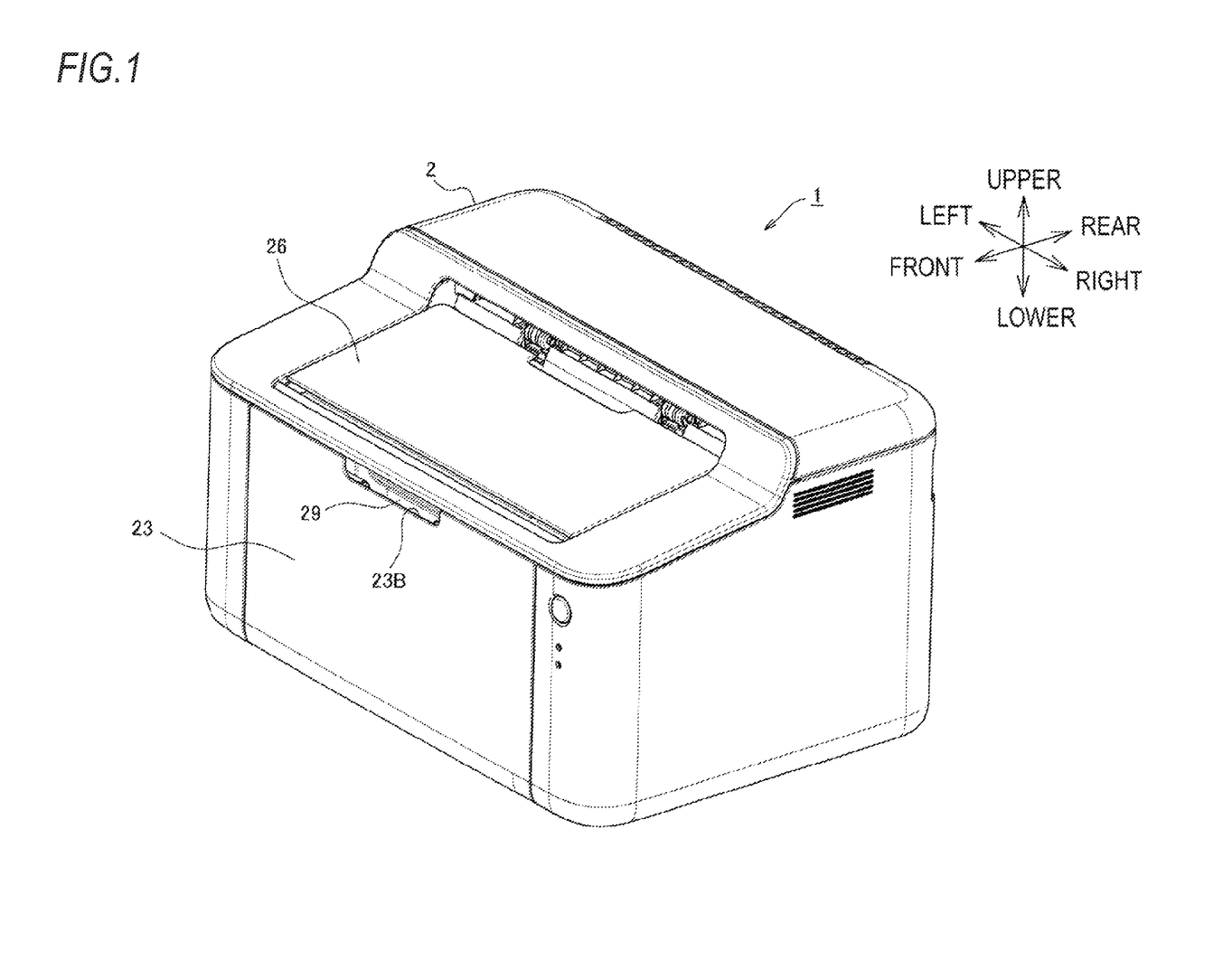
FIG. 1 is a perspective view of an outward appearance of a laser printer.

Hereinafter, an exemplary embodiment will be described with reference to the drawings. FIG. 1 is a perspective view of an outward appearance of a laser printer 1 serving as the image forming apparatus. Meanwhile, in the below descriptions, the directions are described on the basis of a user who uses the laser printer 1. That is, in FIG. 1, the left-front side of the sheet is referred to as the 'front side', the right-inner side of the sheet is referred to as the 'rear side', the left-inner side of the sheet is referred to as the 'left side' and the right-front side of the sheet is referred to as the 'right side.' The upper-lower direction of the sheet is referred to as the 'upper-lower direction.'

Figure 2:
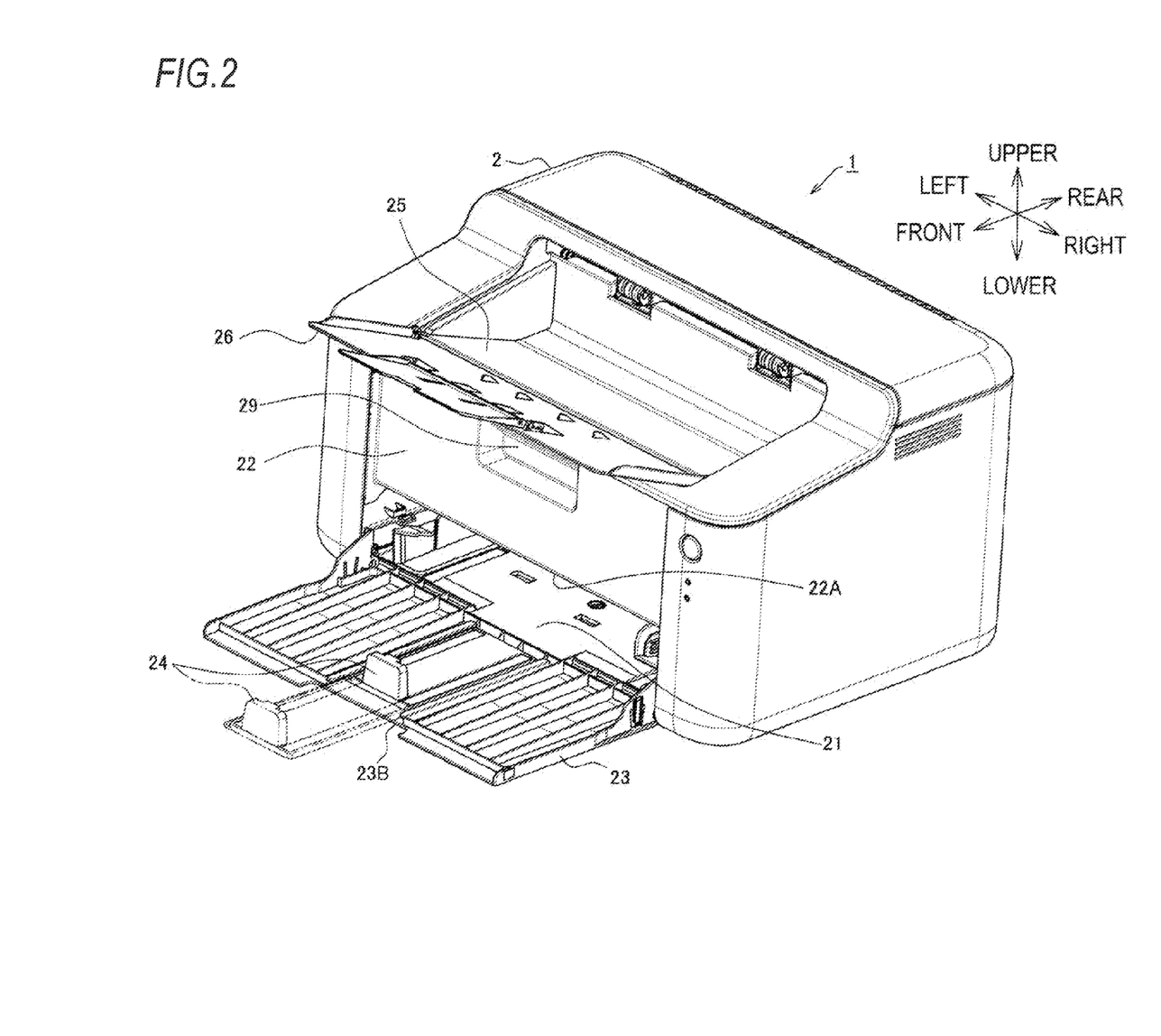
FIG. 2 is a perspective view of the outward appearance of the laser printer showing a state where respective covers are opened.

As shown in FIG. 1, the laser printer 1 has a housing 2 of a substantially rectangular parallelepiped shape and has a sheet feeding cover 23 (which is an example of the feeding tray) at a front side part of the housing 2 and a sheet discharge cover 26 at an upper part thereof so that they can be respectively opened and closed. FIG. 2 is a perspective view of the out and appearance of the laser printer 1 showing a state where the sheet feeding cover 23 and the sheet discharge cover 26 are opened. As shown in FIGS. 1 and 2, the sheet feeding cover 23 is connected to a lower end of a front side wall 22, which is a sidewall of one side surface of the housing 2, via a hinge 23A. The sheet feeding cover 23 swings about a shaft of the hinge 23A, so that it can be moved to an accommodation position at which the t feeding cover accommodated along the front side wall 22, as shown in FIG. 1, and to a holding position at which the sheet feeding cover is connected to a tray part 21 in the same plane shape, which tray part is arranged at a lower pan of the housing 2, and holds a sheet P (refer to FIG. 3: an example of the recording medium), as shown in FIG. 2.

The sheet feeding cover 23 is provided with a rear guide 24 (which is an example of the guide) that abuts on a rear end of the sheet P, which is held on the sheet feeding cover 23, in a conveyance direction when the sheet feeding cover 23 is arranged at the holding position. In the meantime, as shown in FIG. 2, the rear guide 24 has a slide pan that slides along the sheet feeding cover 23. The rear guide 24 can be moved between a reception position shown with the solid line in FIG. 2 and a pullout position shown with the dashed-two dotted line in FIG. 2 and more pulled out in a free end direction of the sheet feeding cover 23 beyond the sheet feeding cover 23. That is, the rear guide 24 can be moved to a preferable position and then used in accordance with a length of the sheet P in the conveyance direction, which is put on the sheet feeding cover 23.

In the meantime, the sheet discharge cover 26 is supported so that it can be swung to an open position (refer to FIG. 2) at which the sheet discharge cover 26 is connected to a sheet discharge tray 25 in the same plane shape, which is provided to the upper part of the housing 2 so that the sheet discharge tray is inclined upwardly towards the front, and a close position (refer to FIG. 1) at which the sheet discharge cover 26 covers the sheet discharge cover 25 from the upper. Upon the image formation of the laser printer 1, the sheet feeding cover 23 is arranged at the holding position and the sheet discharge cover 26 is arranged at the open position, respectively. An end edge of a free end-side of the sheet feeding cover 23 (i.e., an end edge of an opposite side to a side of the sheet feeding cover 23 that is swingably supported) is formed with a notch 23B for laying a user's hand thereon when swinging the sheet feeding cover 23. The front side wall 22 is formed with a recess part 29 at a position at which the recess part is opposed to the rear guide 24 and notch 23B when the sheet feeding cover 23 is arranged at the accommodation position. The configuration and effects of the recess part 29 will be specifically described later.

[Internal Configuration of Laser Printer]

Figure 3:
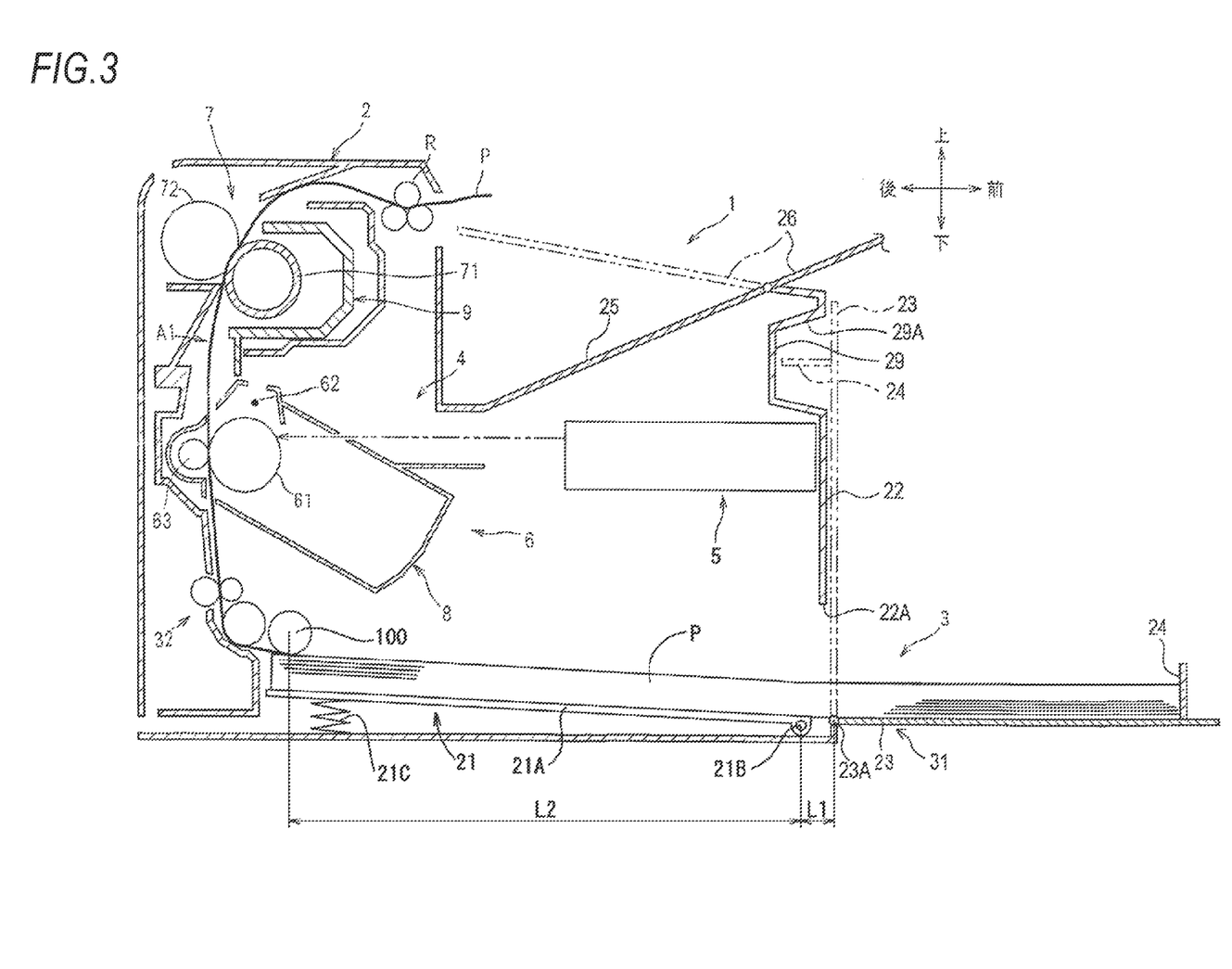
FIG. 3 is a central sectional view schematically showing an internal configuration of the laser printer.

FIG. 3 is a central sectional view schematically showing an internal configuration of the laser printer 1. As shown in FIG. 3, the laser printer 1 has, in the housing 2, a feeder unit 3 for feeding the sheet P and an image forming unit 4 for forming an image on the sheet P.

The feeder unit 3 has a sheet feeding tray 31 that is provided at a lower part of the housing 2 and a sheet feeding mechanism 32 that feeds the sheet P on the sheet feeding tray 31 towards the image forming unit 4.

The sheet feeding mechanism 32 has a pickup roller 100 that picks up the sheet P and the other oilers that convey the picked up sheet P towards the image forming unit 4.

The sheet feeding tray 31 has the tray part 21 that is arranged at the lower part of the housing 2 and the sheet feeding cover 23 that is arranged at the holding position.

The tray part 21 has a pressing plate 21A that is connected to the housing 2 via a hinge 21B and a spring 21C that pushes the pressing plate 21A towards the roller 100.

The housing 2 is formed at the lower part thereof with an opening 22A. At a lower part of the opening 22A, the sheet feeding cover 23 is connected via the hinge 23A.

The sheet P is put on the sheet feeding tray 31 through the opening 22A. That is, in the feeder unit 3, the sheet feeding cover 23 is arranged at the holding position, so that the sheet feeding tray 31 is formed. After that the sheet P is put on the sheet feeding tray 31. The spring 21C pushes the pressing plate 21A towards the roller 100, thereby bringing the sheet P put on the pressing plate 21A into contact with the roller 100 with a favorable force.

The image forming unit 4 has a scanner unit 5, which is an example of the exposure unit, a process unit 6, which is an example of the process unit and a fixing unit 7. The scanner unit 5 has a laser emitting unit, a polygon mirror, a lens, a reflector and the like, which are not shown. The scanner unit 5 is provided at the front-upper part in the housing 2. The scanner unit 5 is arranged so that an emission position of a laser beam is lower than a lower end of the sheet discharge tray 25, and emits the laser beam in a substantially horizontal direction. The scanner unit 5 emits and scans the laser beam on a surface of a photosensitive drum 61 that is an example of the photosensitive member (which will be described later).

Here, as shown in FIG. 3, the pressing plate 21A extends from a neighborhood of the opening 22A to a neighborhood of the roller 100 in the housing 2 and a distance L1 from the hinge 21B to the hinge 23A is shorter than a distance L2 from the hinge 21B to the roller 100. With this configuration, it is possible to increase a contact length of the pressing plate 21A with the sheet P as long as possible. As a result, it is possible to press the sheet P towards the roller 100 while stably holding the sheet P put on the pressing plate 21A.

The process unit 6 has a photosensitive drum 61, a charge wire 62 that charges the photosensitive drum 61 by discharge, a transfer roller 63 that transfers a toner image (developer image on the photosensitive drum 61 to the sheet P and a process-side housing 8. In the process-side housing 8, the photosensitive drum 61, the charge wire 62 and the transfer roller 63 are accommodated and a toner accommodation chamber, a developing roller and the like (which are well known and are not shown) are provided.

In the process unit 6, when it is detected that the sheet P is conveyed, a surface of the photosensitive drum 61 being swung is uniformly charged by the charge wire 62. After that, the surface of the photosensitive drum 61 is exposed by the high-speed scanning of the laser beam emitted from the scanner unit 5. Thereby, a potential of the exposed part is lowered, so that an electrostatic latent image based on image data is formed on the surface of the photosensitive drum 61. Then, the toner in the toner accommodation chamber is supplied to the electrostatic latent image on the photosensitive drum 61 by the developing roller, so that a toner image is formed on the surface of the photosensitive drum 61. Then, the sheet P is conveyed between the photosensitive drum 61 and the transfer roller 63, so that the toner image carried on the surface of the photosensitive drum 61 is transferred onto the sheet P.

The fixing unit 7 is arranged above (just above) the process unit 6. Thereby, a conveyance path A1 of the sheet P from the process unit 6 to the fixing unit 7 is formed to extend in a substantially vertical direction. Here, the 'conveyance path A1' means a space through which the sheet P passes.

The fixing unit 7 has a heating roller 71, a pressing roller 72 and a fixing housing 9 accommodating therein the heating roller 71. The heating roller 71 is a member that heats the sheet P and is provided therein with a heat source (not shown) such as a halogen lamp. The pressing roller 72 is a member that sandwiches and conveys the sheet P between the pressing roller 72 and the heating roller 71 and is provided obliquely upwards at the rear of the heating roller 71.

In the fixing unit 7 configured as described above, the toner transferred on the sheet P is heat-fixed while the sheet P passes between the heating roller 71 and the pressing roller 72. In the meantime, the sheet P heat-fixed by the fixing unit 7 is conveyed towards sheet discharge rollers R that are arranged at a downstream side of the fixing unit 7 and is then discharged onto the sheet discharge tray 25 from the sheet discharge rollers R.

[Configuration and Effects around Recess Part of Laser Printer]

As described above, the sheet discharge tray 25 is provided to the upper part of the housing 2 so that the sheet discharge tray is inclined upwardly towards the front. Thereby, the sheet P that is discharged onto the sheet discharge tray 25 is loaded well. The scanner unit 5 is provided at an inside of the front side of the housing 2, i.e., at an inside of the front side wall 22. Since the emission position of the laser beam of the scanner unit 5 is set to be lower than the lower end of the sheet discharge tray 25, a space is formed between the sheet discharge tray 25 and the scanner unit 5. The recess part 29 is formed to enter a dead space between the sheet discharge tray 25 and the scanner unit 5 and accommodates therein the rear guide 24 when the sheet feeding cover 23 is arranged at the accommodation position, as shown with the dashed-two dotted line in FIG. 3. When the sheet feeding cover 23 is arranged at the accommodation position, the opening 22A that is formed at the lower part of the front side wall 22 is closed by the sheet feeding cover 23.

In the meantime, the rear guide 24 is slid as shown in FIG. 2, so that a sheet P of an A4 size, a sheet P of a letter size and a sheet P of a legal size can be put on the sheet feeding tray 31. The recess part 29 is provided at a position at which the rear guide 24 is accommodated therein if the sheet feeding cover 23 is closed at a state where ear guide 24 is arranged near to an end edge of the notch 23B facing the hinge 23A (refer to the solid line in FIG. 2) so as to define a holding position of the sheet P of a letter size. Therefore, even though the rear guide 24 is not moved to the neighborhood of the opening 22A, it is possible to suppress the interference between the rear guide 24 and the front wall 22. As a result, it is possible to improve the user's convenience and to reduce the manufacturing cost of the laser printer 1.

That is, if the rear guide 24 is configured so that when the sheet feeding cover 23 is closed, the rear guide 24 is moved to a position at which the rear guide 24 is inserted into the opening 22A, it may be possible to suppress the rear guide 24 from interfering with the front side wall 22 when closing the sheet feeding cover 23, even without the recess part 29. However, when such configuration is adopted, the configuration of the apparatus is complicated, so that the manufacturing cost of the laser printer 1 is increased. When closing the sheet feeding cover 23, it is necessary to move the rear guide 24, so that the user's convenience is also deteriorated. Compared to this, according to this illustrative embodiment, the recess part 29 is provided, as described above, so that it is possible to improve the user's convenience and to reduce the manufacturing cost of the laser printer 1.

Figure 4A:
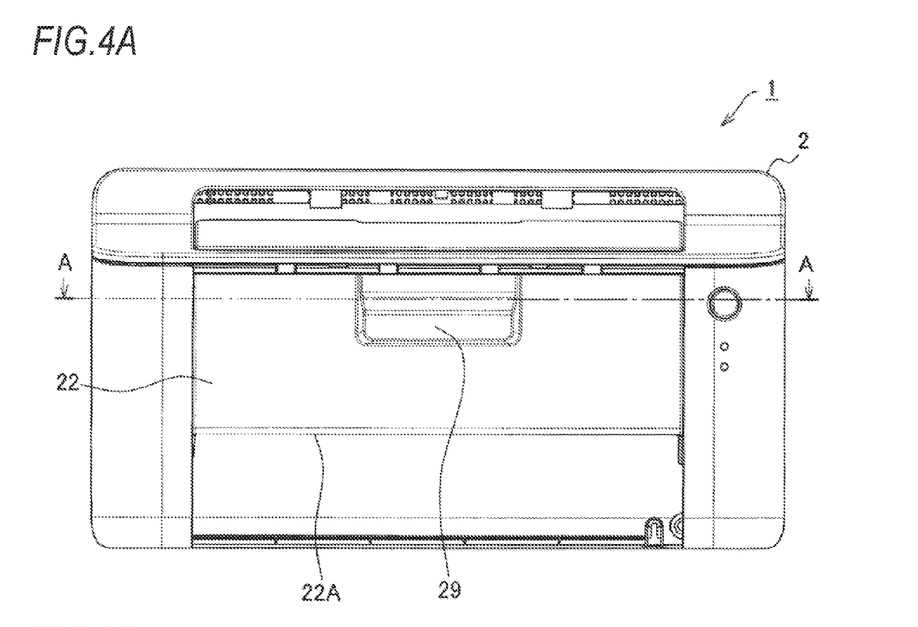
FIG. 4A is a front view of the laser printer.
Figure 4B:
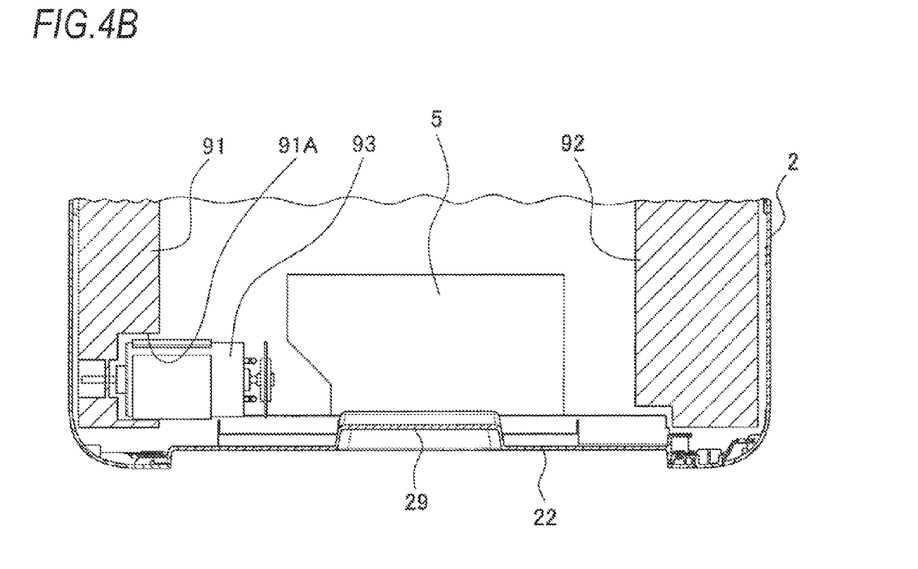
FIG. 4B is a sectional view taken along a line A-A of FIG. 4A.
Figure 5A:
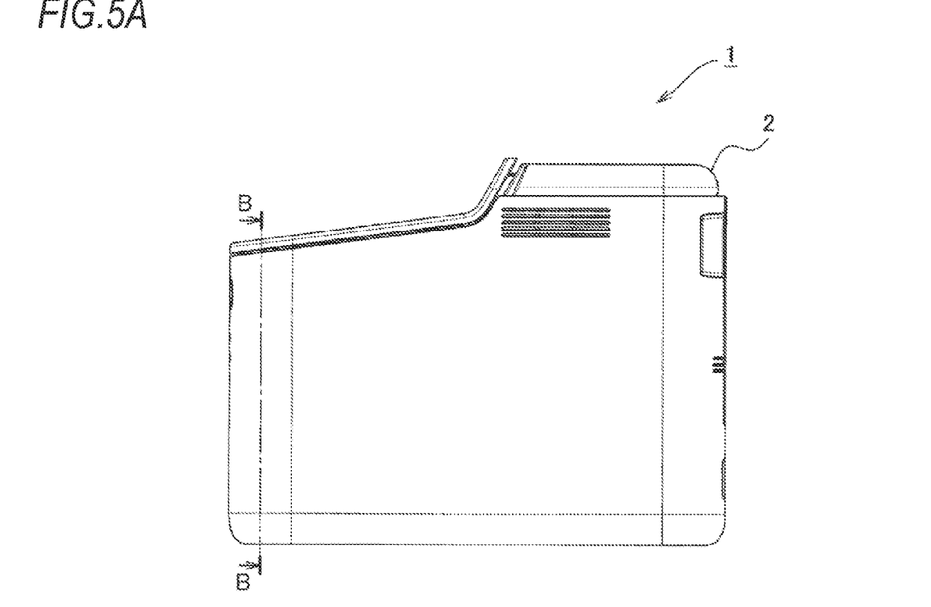
FIG. 5A is a side view of the laser printer.
Figure 5B:
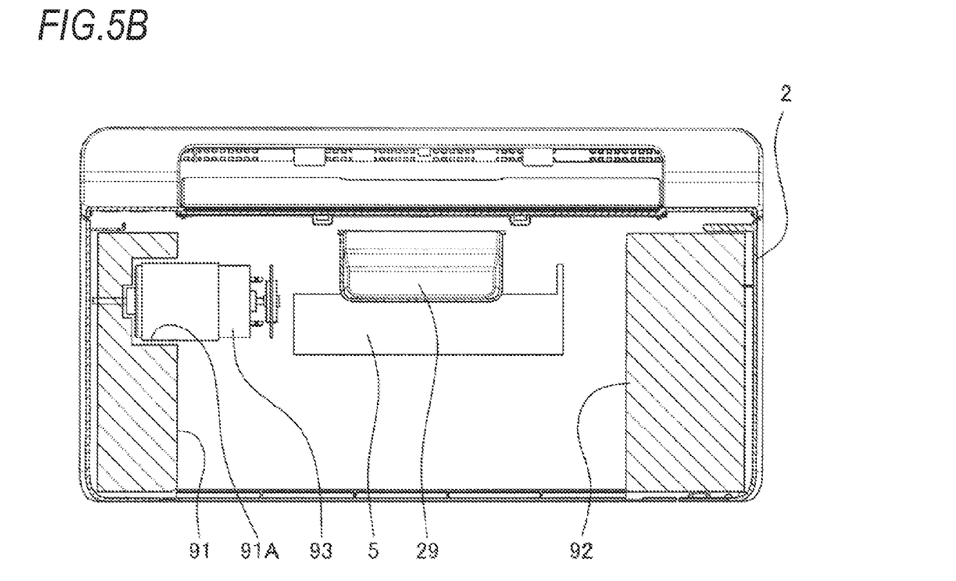
FIG. 5B is a sectional view taken along a line B-B of FIG. 5A.

As shown in FIGS. 4B and 5B, the housing 2 is provided therein with a left frame 91 and a right frame 92 that support the image forming unit 4 from both left and right sides thereof. An neighborhood of a front end of the left frame 91 is formed with a depression portion 91A and a motor 93 for driving the process unit 6 and the like is mounted in the depression portion. As shown in FIGS. 4A to 5B, the recess part 29 is provided at a position at which it overlaps with the motor 93 in the left-right direction. As described above, the recess part 29 is arranged in the dead space between the sheet discharge tray 25 and the scanner unit 5 and overlaps with the motor 93 in the left-right direction. Therefore, according to the laser printer 1, it is possible to effectively use a space in the housing 2 and to thus miniaturize the laser printer.

According to the laser printer 1, it is possible to swing the sheet feeding cover 23 with laying a user's hand on the notch 23B, so that it is possible to swing the sheet feeding cover 23 more easily. The notch 23B is opposed to the recess part 29 when the sheet feeding cover 23 is arranged at the accommodation position, as shown in FIG. 1. Therefore, the operation of swinging the sheet feeding cover 23 to the holding position with laying the user's hand on the notch 23B becomes further easier.

As pictorially shown in FIG. 3, an upper inner wall 29A of the recess part 29 is inclined upwardly towards the front. Therefore, the following additional effects are obtained. That is, as described above, according to the laser printer 1, the process unit 6 and the like are lopsidedly provided towards the rear and the general center of gravity of the laser printer 1 is also lopsided rearwards. Therefore, when a force of pulling up the recess part 29 is applied with laying the user's hand on the recess part 29, the setup state (posture) of the laser printer 1 may be unstable.

Compared to this, according to this illustrative embodiment, the upper inner wall 29A of the recess part 29 is inclined as described above. Thus, even when an operation of pulling up the recess part 29 is performed with laying the user's hand on the recess part 29, the hand slips from the recess part 29, so that it is difficult to pull up the recess part 29. Thereby, it is possible to stably keep the setup state (posture) of the laser printer 1. As described above, according to this illustrative embodiment, since it is difficult to apply the pulling-up force to the front side of the laser printer 1, it is possible to reduce the rigidity of the front side of the housing 2 to which the weighty load is not applied so much. Thus, it is also possible to reduce the total weight and manufacturing cost of the laser printer 1.

In the meantime, the invention is not limited to the above illustrative embodiment and can be variously implemented without departing from the gist of the invention. For example, the rear guide 24 may be integrated with the sheet feeding cover 23 and is thus not moved. The feeding tray of the invention may be supported so that it can swing about a position below the opening. Regarding the image forming unit of the invention, a variety of image forming units may be adopted. For example, a printer engine of a color laser printer and a printer engine of an inkjet printer may be adopted. Regarding the recording medium of the invention, a variety of recording media such as OHP sheets may be adopted.

What is claimed is:

1. An image forming apparatus comprising:
   an image forming unit configured to form an image on a sheet;
   a housing configured to accommodate the image forming unit therein and including a sidewall which forms at least a part of a first side surface of the housing, and an opening which is arranged at a lower part of the sidewall so as to feed the sheet from an outside to the image forming unit, the sidewall and the opening being formed on the first side surface;
   a feeding tray swingably supported by the housing and configured to move between a holding position at which the sheet which is fed to the image forming unit through the opening is held and an accommodation position at which the feeding tray closes the opening;

a guide provided at the feeding tray, the guide being configured to abut against the sheet which is held on the feeding tray from a rear end side of the sheet in a feeding direction, along which the sheet is fed to the image forming unit, and to define a holding position of the sheet when the feeding tray is arranged at the holding position and the sheet is placed on the feeding tray; and a recess part formed on the sidewall of the housing and configured to accommodate the guide therein when the feeding tray is arranged at the accommodation position, wherein a center of gravity of the image forming unit is lopsided towards a side deviating from the first side surface in the housing, and wherein an upper inner wall of the recess part is inclined upwardly towards the first side surface.

2. The image forming apparatus according to claim 1 further comprising a notch that is formed at an end edge of a side opposite to a side of the feeding tray that is swingably supported and that is configured so that a user's hand can be laid on the notch when a user operates the feeding tray, wherein the notch is opposed to the recess part when the feeding tray is arranged at the accommodation position.

3. The image forming apparatus according to claim 1, wherein the image forming unit comprises:

an exposure unit that is provided at a first side surface-side in the housing and is configured to scan and expose a photosensitive drum by a laser light, and a process unit that is provided at the side deviating from the first side surface in the housing, the process unit including the photosensitive drum on which an electrostatic latent image is formed, scanned and exposed with the exposure unit by the laser light, the process unit being configured to form an image corresponding to the electrostatic latent image on the sheet, and wherein the recess part is provided over the exposure unit.

4. The image forming apparatus according to claim 1, further comprising a discharge tray that is provided at an upper part of the housing, wherein the discharge tray is inclined upwardly towards the first side surface and wherein the discharge tray is configured to receive discharge of the sheet having the image formed thereon, wherein the recess part is provided below the discharge tray.

5. An image forming apparatus comprising:

an image forming unit configured to form an image on a sheet;

a housing configured to accommodate the image forming unit therein and including a sidewall which forms at least a part of a first side surface of the housing, and an opening which is arranged at a lower part of the sidewall so as to feed the sheet from an outside to the image forming unit, the sidewall and the opening being formed on the first side surface;

a feeding tray swingably supported by the housing and configured to move between a holding position at which the sheet which is fed to the image forming unit through the opening is held and an accommodation position at which the feeding tray closes the opening;

a guide provided at the feeding tray, the guide being configured to abut against the sheet which is held on the feeding tray from a rear end side of the sheet in a feeding direction, along which the sheet is fed to the image forming unit, and to define a holding position of the sheet when the feeding tray is arranged at the holding position and the sheet is placed on the feeding tray;

a recess part formed on the sidewall of the housing and configured to accommodate the guide therein when the feeding tray is arranged at the accommodation position; and a motor that is provided at an inner side of a second side surface of the housing perpendicular to the first side surface and is configured to drive the image forming unit, wherein the recess part is provided at a position at which the recess part overlaps with the motor in a direction parallel with the first side surface and perpendicular to the first side surface in an upper-lower direction.

6. An image forming apparatus comprising:

an image forming unit configured to form an image on a sheet;

a housing configured to accommodate the image forming unit therein and including a sidewall which forms at least a part of a first side surface of the housing, and an opening which is arranged at a lower part of the sidewall so as to feed the sheet from an outside to the image forming unit, the sidewall and the opening being formed on the first side surface;

a feeding tray swingably supported by the housing and configured to move between a holding position at which the sheet which is fed to the image forming unit through the opening is held and an accommodation position at which the feeding tray closes the opening;

a guide provided at the feeding tray, the guide being configured to abut against the sheet which is held on the feeding tray from a rear end side of the sheet in a feeding direction, along which the sheet is fed to the image forming unit, and to define a holding position of the sheet when the feeding tray is arranged at the holding position and the sheet is placed on the feeding tray;

a recess part formed on the sidewall of the housing and configured to accommodate the guide therein when the feeding tray is arranged at the accommodation position;

a roller configured to send the sheet to the image forming unit and provided in the housing;

a pressing plate configured to hold the sheet;

a first hinge configured to connect one end of the pressing plate to the housing;

a spring configured to push the pressing plate towards the roller; and a second hinge configured to swingably connect the housing and the feeding tray, wherein a distance from the first hinge to the second hinge is shorter than a distance from the first hinge to the roller.

7. The image forming apparatus according to claim 5, further comprising a notch that is formed at an end edge of a side opposite to a side of the feeding tray that is swingably supported and that is configured so that a user's hand can be laid on the notch when a user operates the feeding tray, wherein the notch is opposed to the recess part when the feeding tray is arranged at the accommodation position.

8. The image forming apparatus according to claim 5, wherein the image forming unit comprises:

an exposure unit that is provided at a first side surface-side in the housing and is configured to scan and expose a photosensitive drum by a laser light, and a process unit that is provided at the side deviating from the first side surface in the housing, the process unit including the photosensitive drum on which an electrostatic latent image is formed, scanned and exposed with the exposure unit by the laser light, the process unit being configured to form an image corresponding to the electrostatic latent image on the sheet, and wherein the recess part is provided over the exposure unit.

9. The image forming apparatus according to claim 5, further comprising a discharge tray that is provided at an upper part of the housing, wherein the discharge tray is inclined upwardly towards the first side surface and wherein the discharge tray is configured to receive discharge of the sheet having the image formed thereon, wherein the recess part is provided below the discharge tray.

10. The image forming apparatus according to claim 6, further comprising a notch that is formed at an end edge of a side opposite to a side of the feeding tray that is swingably supported and that is configured so that a user's hand can be laid on the notch when a user operates the feeding tray, wherein the notch is opposed to the recess part when the feeding tray is arranged at the accommodation position.

11. The image forming apparatus according to claim 6, wherein the image forming unit comprises:

an exposure unit that is provided at a first side surface-side in the housing and is configured to scan and expose a photosensitive drum by a laser light, and a process unit that is provided at the side deviating from the first side surface in the housing, the process unit including the photosensitive drum on which an electrostatic latent image is formed, scanned and exposed with the exposure unit by the laser light, the process unit being configured to form an image corresponding to the electrostatic latent image on the sheet, and wherein the recess part is provided over the exposure unit.

12. The image forming apparatus according to claim 6, further comprising a discharge tray that is provided at an upper part of the housing, wherein the discharge tray is inclined upwardly towards the first side surface and wherein the discharge tray is configured to receive discharge of the sheet having the image formed thereon, wherein the recess part is provided below the discharge tray.

* * * * *